US007099879B2

(12) United States Patent
Tacaille et al.

(10) Patent No.: US 7,099,879 B2
(45) Date of Patent: Aug. 29, 2006

(54) REAL-TIME MONITORING OF SERVICE PERFORMANCE THROUGH THE USE OF RELATIONAL DATABASE CALCULATION CLUSTERS

(75) Inventors: Olivier Tacaille, Antibes (FR); Frederic Eynard, Grasse le plan (FR); Christophe T. Laye, Valbonne (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 508 days.

(21) Appl. No.: 10/133,166

(22) Filed: Apr. 26, 2002

(65) Prior Publication Data

US 2003/0120666 A1 Jun. 26, 2003

(30) Foreign Application Priority Data

Dec. 21, 2001 (EP) .................................. 01403342

(51) Int. Cl.
*G06F 17/30* (2006.01)
(52) U.S. Cl. ...................... 707/100; 707/104.1; 707/10
(58) Field of Classification Search ......... 707/1–104.1; 709/223–225; 714/4, 47, 48
See application file for complete search history.

(56) References Cited

U.S. PATENT DOCUMENTS

| | | | | |
|---|---|---|---|---|
| 6,000,045 | A * | 12/1999 | Lewis .......................... | 714/47 |
| 6,055,493 | A | 4/2000 | Ries et al. ................... | 702/186 |
| 6,061,724 | A | 5/2000 | Ries et al. ................... | 709/224 |
| 2002/0007468 | A1* | 1/2002 | Kampe et al. ................. | 714/4 |
| 2002/0059427 | A1* | 5/2002 | Tamaki et al. ............. | 709/226 |
| 2002/0120741 | A1* | 8/2002 | Webb et al. ................ | 709/225 |
| 2003/0097443 | A1* | 5/2003 | Gillett et al. ............... | 709/225 |

FOREIGN PATENT DOCUMENTS

| | | |
|---|---|---|
| EP | 1 111840 | 6/2001 |
| WO | WO 98/42102 | 9/1998 |
| WO | WO 00/64108 | 10/2000 |

OTHER PUBLICATIONS

P. Georgatsos et al.; *Management Services for Performance Verification in Broadband Multi-Service Networks;* Bringing Telecommunication Services To The People—ISS & N 1995. Third International Conference On Intelligence In Broadband Services and Networks, Heraklion, Crete, Oct. 16-19, 1995. Proceedings, Proceedings of the International Conference On INT, vol. Conf. 3, Oct. 16, 1995; pp. 275-289, XP000593482.
European Search Report dated Apr. 2, 2002, Application No. EP 01 40 3343.5 (3 p.).

(Continued)

*Primary Examiner*—Charles Rones
*Assistant Examiner*—Neveen Abel-Jalil (57) ABSTRACT

A system and method for monitoring service performance are disclosed. In a preferred embodiment, the method comprises: (a) collecting service information from one or more sources in a telecommunications network; (b) converting the service information into values of primary parameters of a service model; and (c) calculating values of secondary parameters of the service model from the primary parameter values, wherein the calculating is performed using relational database tables based on calculation clusters. The calculation clusters are preferably determined from a hierarchical model of the service by dividing the hierarchy in a manner that separates shared service components from the service components that share them, and that separates service components related by 1-to-n and n-to-1 relationships.

16 Claims, 7 Drawing Sheets

OTHER PUBLICATIONS

European Search Report dated Apr. 23, 2002, Application No. EP 01 40 3341.9 (5 p.).

European Search Report date Feb. 28, 2002, Application No. EP 01 40 3342.7 (3 p.).

* cited by examiner

REAL-TIME MONITORING OF SERVICE PERFORMANCE THROUGH THE USE OF RELATIONAL DATABASE CALCULATION CLUSTERS

CROSS-REFERENCE TO RELATED APPLICATIONS

This application claims priority to European Patent Application No. 01403342.7, filed Dec. 21, 2001.

STATEMENT REGARDING FEDERALLY SPONSORED RESEARCH OR DEVELOPMENT

Not applicable.

BACKGROUND OF THE INVENTION

1. Field of the Invention

This invention generally relates to systems and methods for Quality of Service management. More specifically, this invention relates to an improved system for providing real-time monitoring of service quality.

2. Description of the Related Art

The field of telecommunications is evolving. Telecommunications networks began as lines of signaling towers that visually relayed messages from tower to tower. The invention of the telegraph led to electrical communication over wires strung between the transmitter and receiver. Switching techniques were then created to allow a given wire to be used for communication between different transmitters and receivers. What really fueled the expansion of telecommunications networks thereafter was the creation of the telephone, which allowed telephone owners to transmit and receive voice communications over the telegraph wires. It became necessary for telephone companies to maintain a complex infrastructure of telephones, wires, and switching centers.

The telecommunications industry continues to grow, due in large part to the development of digital technology, computers, the Internet, and various information services. The sheer size of the telecommunications infrastructure makes it difficult to manage. Various specializations have sprung up, with telecommunications "carriers" providing and maintaining channels to transport information between localities, and telecommunications "providers" that provide and maintain local exchanges to allow access by end-users, and that provide and maintain billing accounts. In addition, a variety of telecommunications-related businesses exist to provide services such as directory assistance, paging services, voice mail, answering services, telemarketing, mobile communications, Internet access, and teleconferencing.

The relationships between the various entities vary wildly. In an effort to promote efficiency in developing, overseeing, and terminating relationships between telecommunications entities, the TeleManagement Forum has developed a preliminary standard GB 917, "SLA Management Handbook", published June, 2001, that provides a standardized approach to service agreements. Service level agreements, much as the name suggests, are agreements between a telecommunications entity and its customer that the entity will provide services that satisfy some minimum quality standard. The complexity of the telecommunications technology often makes the specification of the minimum quality standard a challenging affair. The approach outlined in the handbook discusses differences between network parameters (the measures that a carrier uses to monitor the performance of the channels used to transport information) and quality of service (QoS) (the measures of service quality that have meaning to a customer). Telecommunications entities need to be able to relate the two measures for their customers.

Next generation (fixed and mobile) network service providers will be urgently competing for market share. One of their existing challenges is to minimize the delay between creation and roll-out of new added-value services. Telecommunications entities wishing to serve these providers need to have the capability to ensure fine control of newly created services in a very short period (weeks instead of months). Existing service platforms, which depend on technology-specific software development, are inadequate.

As new technologies are introduced, resources will be shared between more customers. Yet the customers will expect higher QoS. Telecommunications entities will need a service platform that can measure and monitor the delivered QoS on a customer-by-customer basis. The existing platforms, which only provide customers with dedicated resources, will be unable to compete.

Because existing service platforms rely on technology-specific software development, deployed technologies (i.e. ATM, IPVPN) have hard-coded models, often with fixed (pre-defined) performance parameters. These models are directed at service level assurance for the provider, and are unsuitable for monitoring individual customer QoS. Further, this approach requires that service models for new technologies be developed from scratch, and the resulting heterogeneity of tools required to monitor the different services and/or different steps of the service lifecycle and/or different data required to compute the service status (faults, performance data) guarantees inefficiency and confusion.

For the above reasons, an efficient system and method for service model development, QoS measurement, with customer-by-customer customization, and real-time monitoring, is needed.

SUMMARY OF THE INVENTION

The problems outlined above are in large part addressed by a method for monitoring service performance. In a preferred embodiment, the method comprises: (a) collecting service information from one or more sources in a telecommunications network; (b) converting the service information into values of primary parameters of a service model; and (c) calculating values of secondary parameters of the service model from the primary parameter values, wherein the calculating is performed using relational database tables based on calculation clusters. The calculation clusters are preferably determined from a hierarchical model of the service by dividing the hierarchy in a manner that separates shared service components from the service components that share them, and that separates service components related by 1-to-n and n-to-1 relationships.

The present invention further contemplates a telecommunications network management system comprising a set of one or more computers executing a software application that monitors service performance. In one embodiment, the application includes: a service database, a service repository manager, a data collector, and a performance data manager. The service database stores a service model having a hierarchy of service components, each component having one or more parameters. The service repository manager provides access to the service database and tracks deployed instances of each service component. The data collector receives service information from one or more sources in a telecommunications network, and converts the service information into values of primary parameters. The performance data manager receives service component instance information from the service repository manager, and processes the service model hierarchy to determine multiple service component clusters.

The use of calculation clusters permits timely calculation of parameters for a very flexible service model. Advantageously, the service model is technology-neutral, and can be customized to represent any telecommunications-related service. Hence, a user can define the service characteristics during the service development. This includes breaking the service down into components, defining associated performance parameters, and defining performance objectives for the service.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

First, a brief note about terminology. In this document, the term "customer" is used to refer to companies that contract with the telecommunications entity for services. For example, customers may be voice-mail providers or internet access providers. Further, as used herein, the term "real time" means that the effect of measurements received by the system are propagated through to the system outputs in less than five minutes. "Near-real-time" means that the effect of these measurements are propagated through the system in less than twenty minutes, but no less than 5 minutes. "Batch" processing means that the system periodically calculates the effect of the measurements, typically on an hourly or daily basis.

Figure 1:
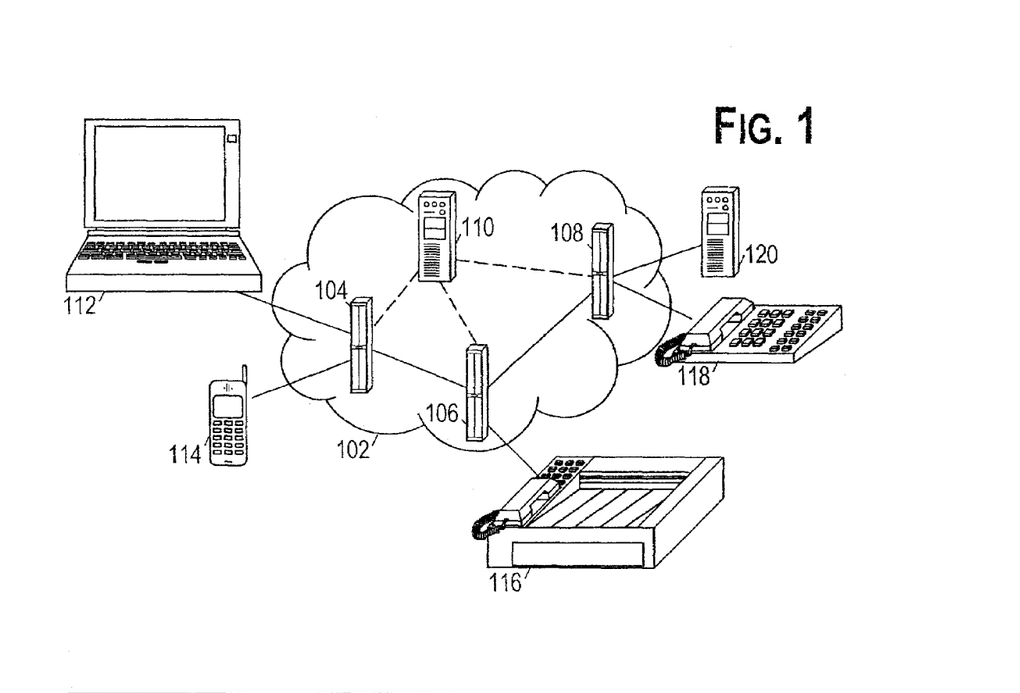
FIG. 1 shows a telecommunications network having a platform for service monitoring.

Turning now to the figures, FIG. 1 shows a telecommunications network 102 having a set of switches 104, 106, 108 that route signals between various devices 112, 114, 116, 118 and resources 120. The network elements are coupled together by communications links, which may include mobile links, satellite links, microwave links, fiber optics, copper wire, etc. The network preferably includes a platform 110 that monitors the performance of the various communications links. Typically, the platform gathers the performance information from monitoring tools embedded in the switches. The platform 110 may assume an active role in which it provides allocation management when redundant communications links exist or when traffic of differing priorities is competing for insufficient bandwidth. The platform 110 may perform allocation management by adjusting the routing configuration of switches 104, 106, 108. The routing configuration includes such parameters as routing table entries, queue lengths, routing strategies, and traffic prioritization. Preferably, the platform 110 performs allocation management to ensure that the network performance remains in compliance with specified performance levels.

Figure 2:
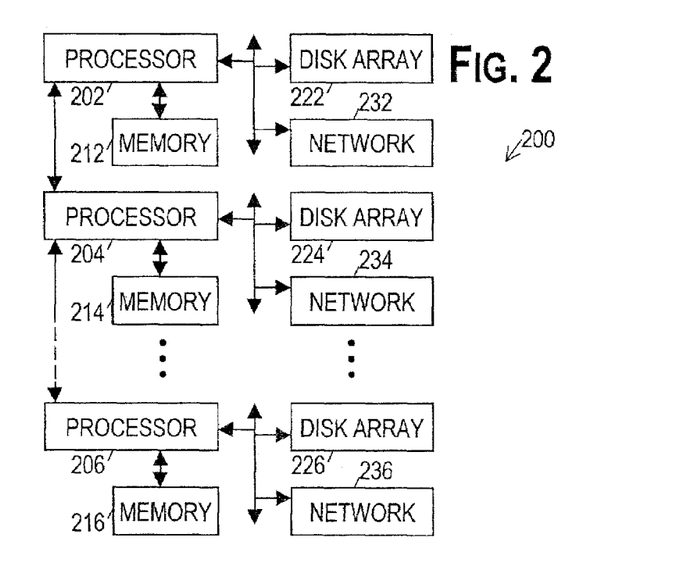
FIG. 2 shows an example block diagram of a server that could be used to run the monitoring software.

FIG. 2 shows block diagram of a server 200 that could be used as a monitoring platform 110. Certainly, other computer configurations could also be used to provide the necessary processing power and input/output bandwidth necessary for this application. If desired, the task may be distributed across multiple computers.

Server 200 may be a Compaq Alpha server, which includes multiple processors 202, 204, 206. The processors are coupled together by processor buses, and each processor 202, 204, 206, is coupled to a respective memory 212, 214, 216. Each of the processors 202, 204, 206, may further be coupled via a respective input/output bus to long term storage devices 222, 224, 226, and to network interfaces 232, 234, 236. The long term storage devices may be magnetic tape, hard disk drives, and/or redundant disk arrays.

The processors 202, 204, 206, each execute software stored in memories 212, 214, 216 to collect and process information from the telecommunications network via one or more of the network interfaces 232, 234, 236. The software may distribute the collection and processing tasks among the processors 202, 204, 206, and may also coordinate with other computers.

Note that a complete copy of the software may be stored in one of the memories 212, but this is unlikely for software applications of the size and complexity contemplated herein. It is more probable that the software will be distributed, with some processors (or computers) executing some software tasks, and other processors (or computers) executing different software tasks. One processor may execute multiple tasks, and one task may be executed by multiple processors (and/or multiple computers). Further, the relationship between processors and software may be dynamic, with the configuration changing in response to processor loading and various system events. Nevertheless, the hardware is configured by the software to carry out the desired tasks.

Because of this loose, dynamic relationship between software and hardware, most software designers prefer to work in the "software domain", sometimes referred to as "cyberspace", and relegate the management of the hardware-software relationship to software compilers, the operating system, and low-level device drivers.

Figure 3:
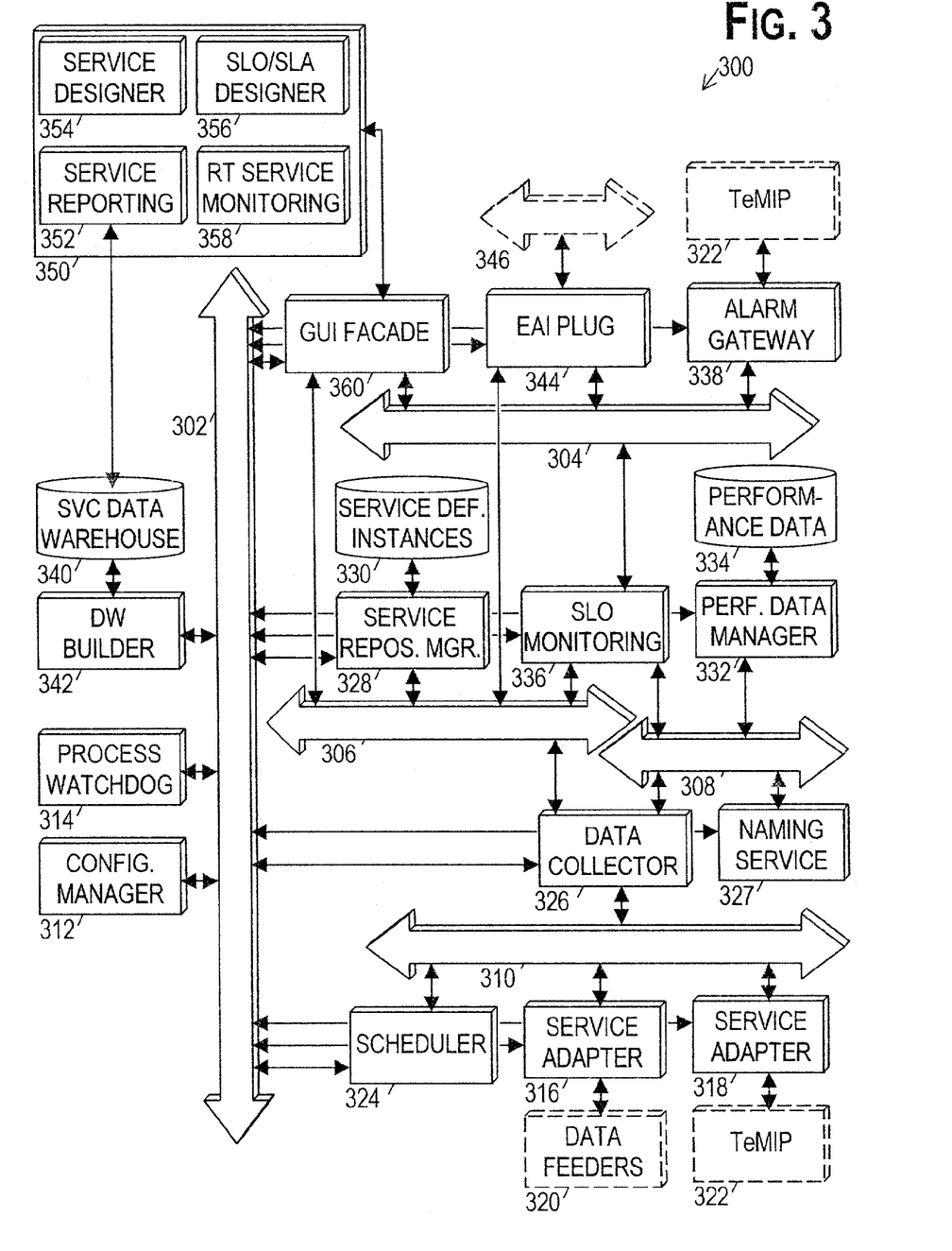
FIG. 3 shows a functional block diagram of the monitoring software.

FIG. 3 shows a block diagram of the software 300 executed by monitoring platform 110. The components of this software are described in four tiers: 1) common services and infrastructure, 2) data collection, 3) data management, and 4) interfaces.

Common Services and Infrastructure

Software 300 includes message buses 302, 304, 306, 308, 310. These message buses are software applications designed to allow communication between networked computers. Tibco Message Bus is one such software application. For details regarding the Tibco Message Bus, refer to "TIB/Rendezvous Concepts: Software Release 6.7", published July 2001 by TIBCO Software, Inc.

The message buses 302–310 provide multiple communications modes, including a de-coupled communication mode between a message publisher and the subscribers to that bus. In this publish/subscribe mode, the publisher does not know anything about the message subscribers. The messages that pass over the buses 302–310 are preferably files in XML (extended markup language) format, that is, files that include self-described data fields. The subscribers receive messages based on an identified message field, e.g., a "topic" or "subject" field.

The buses also provide another communications mode, the request/reply mode. In this mode, the message publisher includes a "reply" field in the message. The bus subscribers that receive the message (based on the "subject" field) process the message and send a response message with the contents of the original "reply" field in the "subject" field.

The buses advantageously provide full location transparency. The bus software conveys the messages to all the suitable destinations, without any need for a central naming service. The preferred bus software employs daemon processes that run on each of the computers and that communicate between themselves using UDP (User Datagram Protocol) and fault-tolerant messaging techniques.

The buses advantageously enable additional fault-tolerance techniques. Each of the components that communicate on a bus may have redundant "shadow" components that run in parallel with the primary component. Each of the components can receive the same messages and maintain the same state, so that if the primary component becomes unstable or "locks up", one of the shadow components can take over without interruption. Alternatively, or in addition, the de-coupled nature of the buses allows a component to be halted and restarted, without affecting other components of the application. This also provides a method for upgrading the software components without stopping the whole system.

TIBCO Software, Inc. (www.tibco.com) provides adapters for most common software applications to allow them to communicate via message buses 302–310. In addition, they offer a software developer toolkit (SDK) that allows programmers to develop similar adapters for other applications. A configuration manager 312 in software 300 provides configuration of these adapters and the applications. The configuration of all the adapters and applications can be stored in a central repository and managed from that central location. As applications (and adapters) are started or reconfigured, their configuration information is retrieved from the central location. This mechanism may be used to preserve configuration information across multiple instances of software components as the processes crash, restart, terminate, and move to new hardware locations.

A process monitoring, or "watchdog" component 314 is also included in software 300 to monitor the execution of the other software components and to take action if a problem develops. The watchdog component may, for example, restart a component that has crashed, or move a component to a different computer if the processor load crosses a given threshold. An existing software component suitable for this purpose is available from TIBCO Software, Inc.

The preferred watchdog component includes autonomous agents, running one per computer. On each computer, the agent monitors and controls all the components running on that computer. The agent receives data from "micro-agents" associated with the components. For example, each adapter may function as a micro-agent that feeds statistics to the local agent.

The preferred watchdog component may further include a graphical user interface (GUI) application that discovers the location of the agents, subscribes to messages coming from the agents, allows a user to author or change the rules used by the agents, and implements termination, moving, and restarting of components when necessary.

The watchdog component 314 and the configuration manager component 312 communicate with the various other components via bus 302, which carries configuration messages.

Data Collection

Data collection occurs via bus 310. Service adapters provide messages on this bus. Two service adapters 316, 318, are shown in FIG. 3, but many more are contemplated. Service adapters 316, 318, are independent processes that each gather data (service information) from one or more data sources. They may perform very minor processing of the service information, but their primary purpose is to place the data into correct form for bus 310, and to enforce the data collection interval.

Data sources 320 are processes (hereafter called "data feeders") that each collect parameter values at a given service access point. A service access point is a defined interface point between the customer and the service being provided. The parameters are chosen to be indicative of such things as usage, error rates, and service performance. The data feeders may be implemented in hardware or software, and may gather direct measurements or emulate end-users for a statistical analysis.

In addition, other applications 322 running on the telecommunications management information platform (TeMIP) 110 may provide data to service adapters 318. Information such as planned or unplanned outages, weather conditions, channel capacities, etc., may be provided from these applications.

Software 300 includes a scheduler component 324 that may be used to provide triggers to those service adapters that need them. For example, many data feeders 320 may provide data automatically, whereas others may require the service adapter 316 to initiate the retrieval of data.

It was mentioned that the service adapters may perform very minor processing. Examples of such processing may include aggregation, counter conversion, and collection interval conversion. Aggregation refers to the combining of data from multiple sources. An example where aggregation might be desired would be the testing of a given server by multiple probes deployed across the country. Counter conversion refers to the conversion of a raw counter output into a meaningful measure. For example, the adapter might be configured to compensate for counter rollover, or to convert a raw error count into an error rate. Collection interval conversion refers to the enforcement of the data collection interval on bus 310, even if the adapter receives a burst of data updates from a data feeder within a single collection interval.

Data collector 326 gathers the data (service information) from bus 310 and translates the data into values for the appropriate parameters of the service model. This may include translating specific subscriber identifiers into customer identifiers. The data collector 326 invokes the assistance of naming service 327 for this purpose. The method for translating collected data into service component parameters is specified by data feeder definitions in database 330. The data collector 326 obtains the service model information from service repository manager 328, and the parameter values are published on bus 308. Note that multiple data collectors 326 may be running in parallel, with each performing a portion of the overall task.

Data Management

The service repository manager 328 is coupled to a database 330. The service repository manager 328 uses database 330 to track and provide persistency of: the service model, data feeder models, instances of service components, service level objectives, and service level agreements. This information may be requested or updated via bus 306.

The parameter values that are published on bus 308 by data collector 326 ("primary parameters") are gathered by performance data manager 332 and stored in database 334. The performance data manager also processes the primary parameters to determine derivative, or "secondary", parameters defined in the service model. The performance data manager may also calculate aggregation values. These features are discussed in further detail in later sections. The secondary parameters are also stored in database 334. Some of these secondary parameters may also be published on bus 308.

The service model may define zero or more objectives for each parameter in the model. These objectives may take the form of a desired value or threshold. A service level objective (SLO) monitoring component 336 compares the parameter values to the appropriate objectives. The comparison preferably takes place each time a value is determined for the given parameter. For primary parameters, the comparison preferably takes place concurrently with the storage of the parameter. The result of each comparison is an objective status, which is published on bus 308 for collection and storage by data manager 332. The status is not necessarily a binary value. Rather, it may be a value in a range between 0 and 1 to indicate some degree of degradation.

Each objective may have a specified action that is to be performed when a threshold is crossed in a given direction, or a desired value is achieved (or lost). When comparing parameter values to objectives, the SLO monitoring component 336 initiates such specified actions. While the actions can be customized, they generally involve publication of a warning or violation message on bus 304, where they can be picked up by an alarm gateway component 338. Examples of other actions may include modification of traffic priorities, alteration of routing strategies adjustment of router queue lengths, variation of transmitter power, allocation of new resources, etc.

The performance data manager 332 and associated database 334 operate primarily to track the short-term state of the telecommunications network. For longer-term performance determination, a data warehouse builder component 342 constructs a "service data warehouse" database 340. Builder 342 periodically extracts information from databases 330, 334, to compile a service-oriented database that is able to deliver meaningful reports in a timely manner. Database 340 is preferably organized by customer, service level agreement, service, individual service instances, service components, and time. Builder 342 may further determine long-term measurements such as service availability percentages for services and customers over specified periods (typically monthly). Other performance calculations may include mean time to repair (MTTR), long term trends, etc. These long-term measurements may also be stored in database 340.

User Interfaces

Alarm gateway component 338 receives warning or violation messages from bus 304 and translates them into alarms. These alarms may be sent to other applications 322 running on platform 110 to initiate precautionary or corrective actions. The type of alarm is based on the message received from bus 304 and the configuration of gateway 338. The alarm typically includes information to identify the customer and the parameter that violated a service level objective. Some indication of severity may also be included.

An enterprise application integration (EAI) interface 344 is preferably included in software 300. The EAI interface 344 provides a bridge between buses 304, 306, and some external communication standard 346, thereby allowing the two-way transfer of information between external applications and software 300. In a preferred embodiment, the transferred information is in XML format, and includes service definition creation (and updates thereof), service instance creation events, service degradation events, service level agreement violation events, Software 300 further includes a graphical user interface (GUI) 350 that preferably provides a set of specialized sub-interfaces 352–358. These preferably interact with the various components of software 300 via a GUI server component 360. The server component 360 preferably provides various security precautions to prevent unauthorized access. These may include user authentication procedures, and user profiles that only allow restricted access.

The first sub-interface is service reporting GUI 352, which provides users with the ability to define report formats and request that such reports be retrieved from database 340. Various existing software applications are suitable that can be readily adapted for this purpose.

The next sub-interface is service designer GUI 354, which provides a user with the ability to graphically model a service in terms of service components and parameters. Predefined service components that can be easily re-used are preferably available. Service designer GUI 354 preferably also allows the user to define for a given service component the relationships between its parameters and the data values made available by service adapters 316.

The third sub-interface is service level designer GUI 356, which allows users to define objectives for the various service component parameters. Objectives may also be defined for performance of service instances and the aggregations thereof.

The fourth sub-interface is real-time service monitoring GUI 358, which allows users to monitor services in near real-time. The user can preferably display for each service: the service instances, the service instance components, and the objective statuses for the services and components. The user can preferably also display plots of performance data.

In addition to the sub-interfaces mentioned, additional sub-interfaces may be provided for GUI 350. For example, GUI 350 may include a service execution GUI that allows a user to define service instances, to specify how services are measured (e.g. which service adapters are used), and to enable or disable data collection.

GUI 350 may further include a service level agreement (SLA) editor. The SLA editor could serve as a bridge between customer management applications (not specifically shown) and software 300. The SLA editor may be used to define an identifier for each customer, and to specify the services that the customer has contracted for, along with the number of service instances and the service level objectives for those instances.

Each of the software components shown in FIG. 3 may represent multiple instances running in parallel. The functions can be grouped on the same machine or distributed. In the latter case, the distribution is fully configurable, either in terms of grouping some functions together or in terms of splitting a single function on multiple machines. As an example, multiple performance data manager instances 332 may be running. One instance might be calculating secondary parameters for each individual service instance, and another might be performing aggregation calculations across customers and across service instances (this is described further below). Even the aggregation may be performed in stages, with various manager instances 332 performing the aggregation first on a regional level, and another manager instance 332 performing the aggregation on a national level. Preferably, the user interface 350 includes a tool to allow the user to distribute and redistribute the tasks of each of the software components among multiple instances as desired.

At this point, a telecommunications network has been described, along with the hardware and software that together form a system for monitoring network performance and maintaining compliance with customer service agreements. The following discussion turns to the methods and techniques employed by the system. These techniques make service agreement monitoring and aggregation viewing robust and achievable in real-time.

Model

Figures 4, 5A, 6:
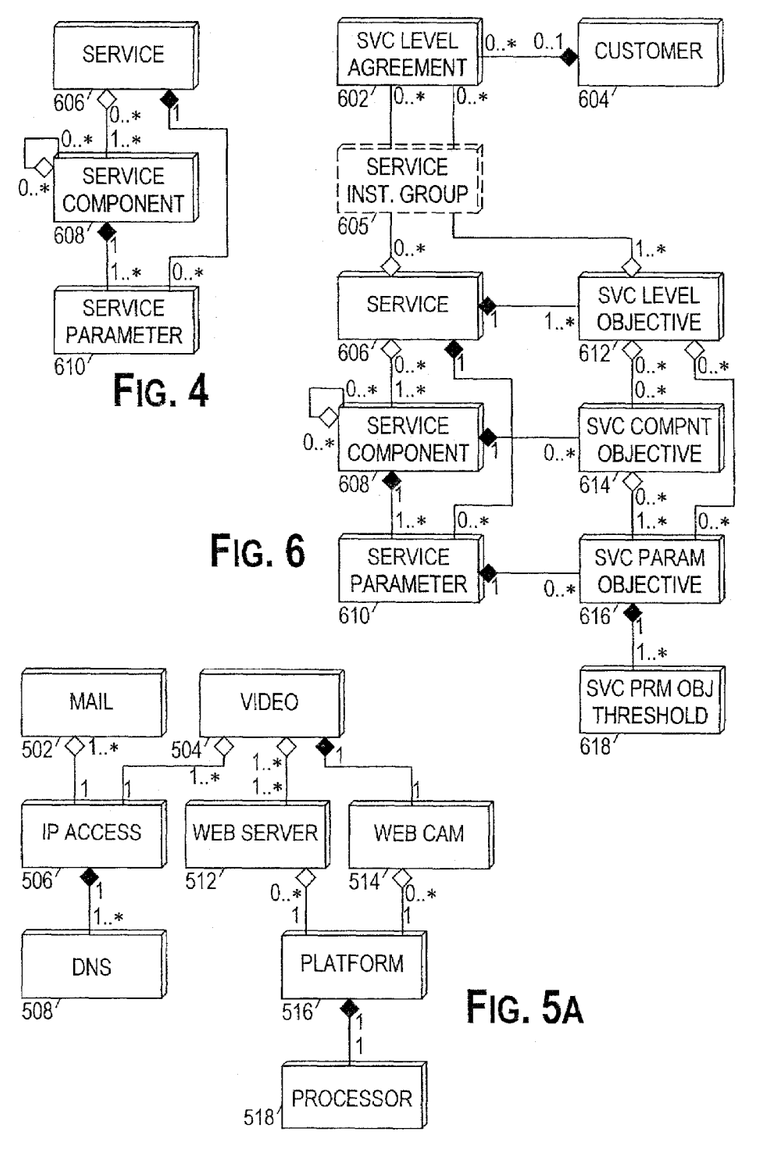
FIG. 4 shows a meta-model for a service.
FIG. 5a shows an example of concrete service models defined in terms of the meta-model.
FIG. 6 shows a meta-model for a service level agreement.

Software 300 uses an object-oriented approach to modeling services. FIG. 4 shows the model structure. This model is best viewed as a meta-model, in that it defines a model from which service models are defined. A service 606 is a collection of service components 608 and the associations therebetween. The service 606 and each of its service components 608 may have one or more service parameters 610 that are uniquely associated with that service or service component. Note that service components 608 may be stacked recursively, so that each service component may have one or more subordinate service components. In addition, each service component 608 has one or more parents. In other words, a given service component may be shared by two or more services or service components.

FIG. 5a illustrates the use of the object-oriented approach to service modeling. An actual or "concrete" service model is built from the objects defined in the meta-model. A mail service 502 requires an internet portal component 506 for internet access. The internet portal component 506 relies on one or more domain name service (DNS) components 508 for routing information. A distinct video service 504 may share the internet portal component 506 (and thereby also share the DNS component 508). Video service 504 also depends on a web server component 512 and a camera component 514. Both components 512, 514 are operating from an underlying platform component 516.

One of the advantages of software 300 is that the service model may be dynamically updated while the system is in operation and is collecting data for the modeled service. For example, a user might choose to add a processor component 518 and tie it to the platform component 516. Depending on the relationship type, the software may automatically instantiate the new component for existing instances of platform components 516, or the software may wait for the user to manually create instances of the processor component.

Each of the components has one or more service parameters 610 associated with it. Parameter examples include: usage, errors, availability, state, and component characteristics. For efficiency, the parameter types are preferably limited to the following: text strings, integers, real numbers, and time values.

As an example, the internet portal component 506 may have associated service parameters for resource usage, and for available bandwidth. The server component 512 might have a service parameter for the number of errors. Once these parameters have been calculated, it will be desirable to determine if these parameters satisfy selected conditions. For example, a customer might stipulate that the resource usage parameter be less than 80%, that the average bandwidth be greater than 5 Mbyte/sec, and that the number of errors be less than 10%.

Figure 5B:
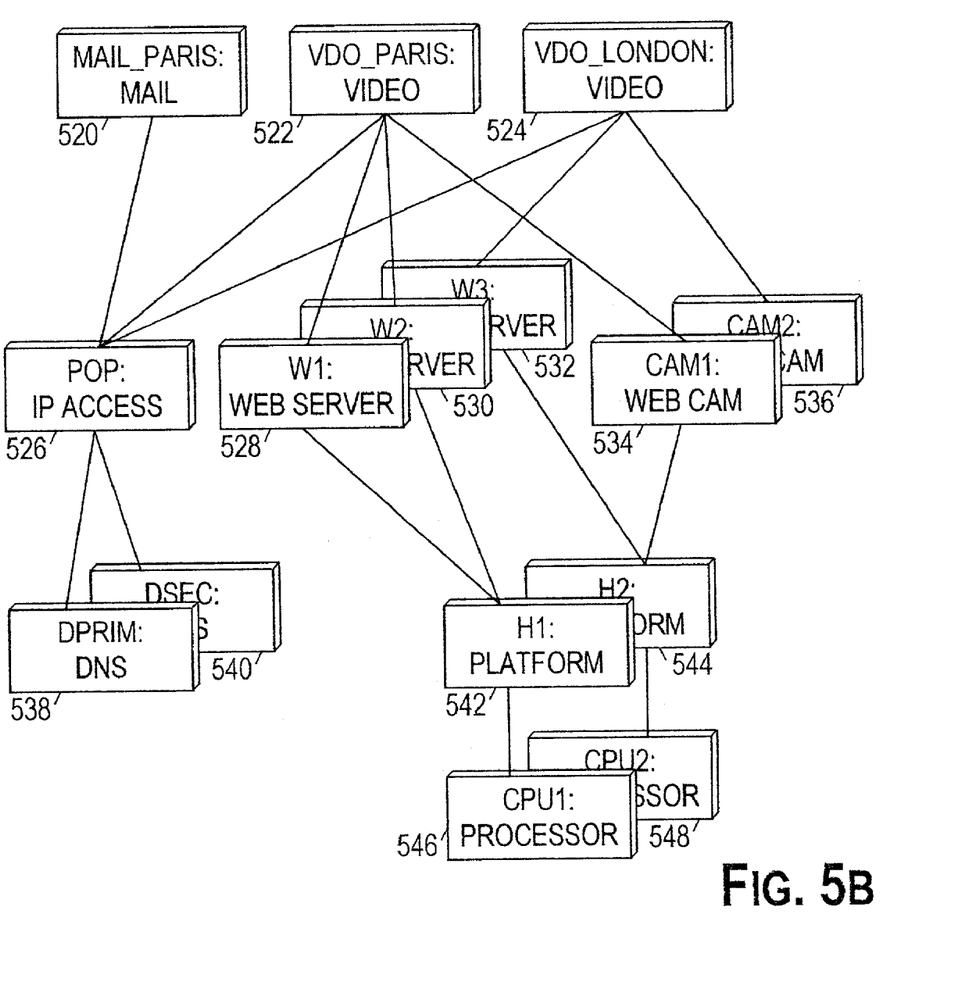
FIG. 5b shows an example of instantiated service models defined in terms concrete service model.

FIG. 5b shows an example of service instances that are instantiated from the concrete service model in FIG. 5a. Note that multiple instances may exist for each of the components. This is but one possible service configuration that may result when the service model of FIG. 5a is deployed. A mail service instance "MAIL_PARIS" 520, and two video service instances "VDO_PARIS" 522 and "VDO_LONDON" 524 are shown. The mail service instance 520 is tied to an IP access instance "POP" 526, which in turn is tied to two DNS instances "DPRIM" 538 and "DSEC" 540.

The first video service instance 522 depends on two web servers "W1" 528 and "W2" 530, and on a web cam "CAM1" 534. Video service instance 522 also shares IP access instance 526 with mail service instance 520 and video service instance 524. The two web servers 528, 530, are running on platform "H1" 542, which is tied to processor "CPU1" 546. The second video service instance 524 is tied to web server instance "W3" 532 and web cam "CAM2" 536, both of which share a platform instance "H2" 544, which is tied to processor instance "CPU2" 548.

This meta-model approach provides a flexible infrastructure in which users can define specific service models, which are then deployed as service instances. Each deployed instance may correspond to an actively monitored portion of the telecommunications network.

The parameters for each instance of a service or service component fall into two categories: customer dependent, and customer independent. As customer dependent parameters are determined by the data collector 326 or calculated by the performance data manager 332, a separate parameter is maintained for each of the customers. Conversely, only one parameter is maintained for each of the customer independent parameters associated with a given instance of a service or service component.

FIG. 6 shows the service meta-model in the context of a larger service-level agreement meta-model. Beginning at the lowest level, each service parameter 610 may have one or more service parameter objectives associated with it. A service parameter objective (SPO) 616 is a collection of one or more SPO thresholds 618 that specify values against which the service parameter 610 is compared. The SPO thresholds 618 also specify actions to be taken when the objective is violated, and may further specify a degradation factor between zero and one to indicate the degree of impairment associated with that objective violation. The service parameter objective 616 has an objective status that is set to the appropriate degradation factor based on the position of the parameter relative to the specified thresholds.

The service parameter objective 616 may further specify a crossing type and a clear value.

When a crossing type is specified (e.g. upward or downward) by a service parameter objective 616, the action specified by the SPO threshold 618 is taken only when the parameter value reaches (or passes) the specified threshold value from the appropriate direction. The action may, for example, be the generation of an alarm. When a clear value is specified, the degradation factor for the parameter is set to zero whenever the parameter is on the appropriate side of the clear value.

The objective statuses of one or more service parameter objectives 616 that are associated with a given service component 608 may be aggregated to determine an objective status for that service component. The method of such an aggregation is defined by a service component objective 614. Similarly, the objective statuses of service component objectives 614 and service parameter objectives 616 can be aggregated to determine an objective status for the service 606. The method for this aggregation is defined by a service level objective 612.

It is expected that service level objectives 612 may serve one or more of the following purposes. Contractual objectives may be used to check parameter values against contract terms. Operational objectives may be used for pro-active management; i.e. detecting problems early so that they can be corrected before contract terms are violated. Network objectives may be used for simple performance monitoring of systems.

A service-level agreement (SLA) object 602 may be defined to specify one or more service level objectives 612 for one or more services 606. The SLA object 602 may be uniquely associated with a customer 604. The SLA object operates to gather the objectives for a given customer together into one object.

Note that the objects of FIG. 6 may be instantiated multiple times, so that, for example, there may be multiple instances of service 606 with each instance having corresponding instances of the various components, parameters, objectives, and thresholds defined for that service 606. When this occurs, a service instance group object 605 is added to the model to serve as a common root for the service instances. If a service is instantiated only once, the group object 605 may be omitted.

Figure 7:
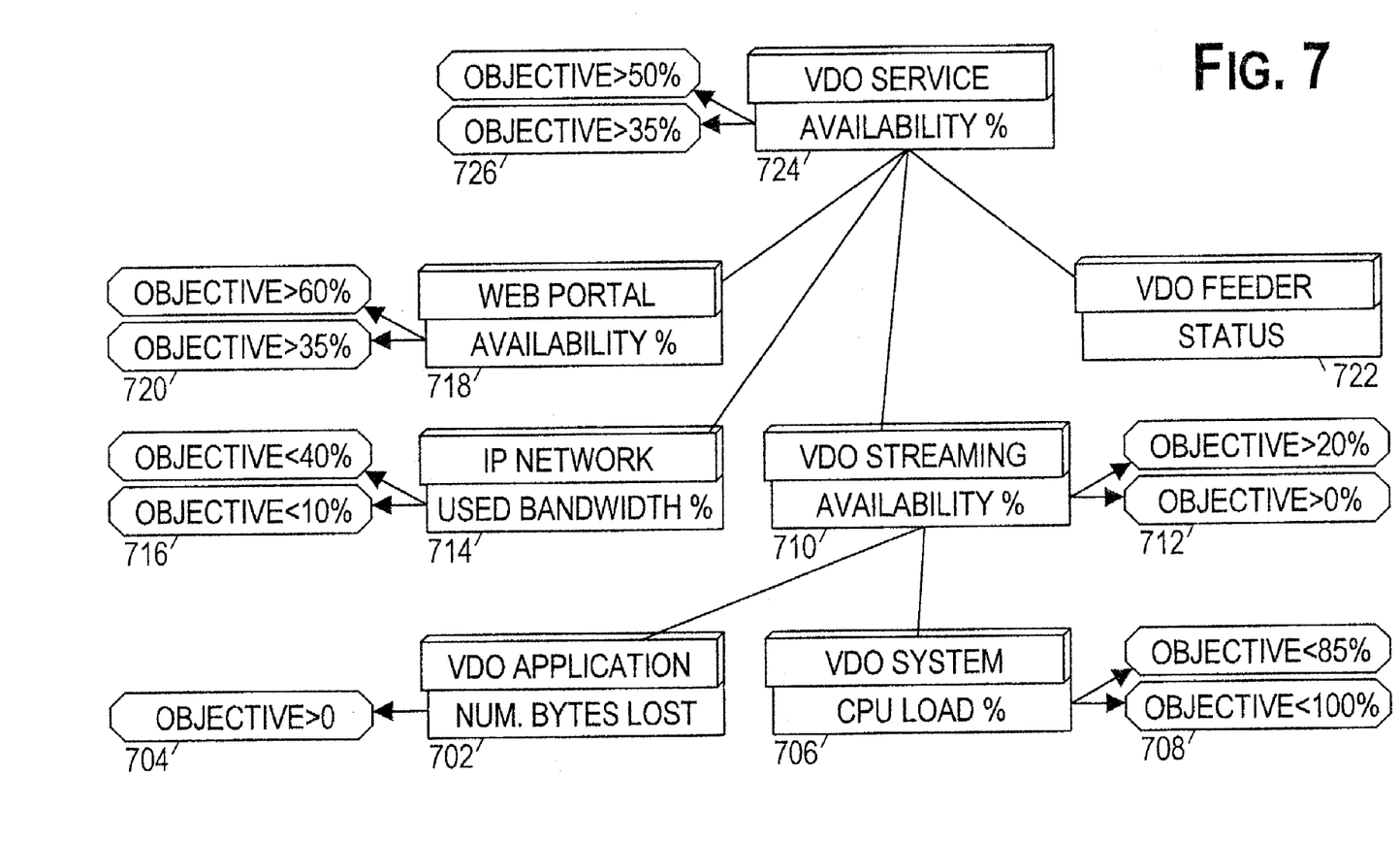
FIG. 7 shows an example of association of objectives with service model parameters.

FIG. 7 shows an example of an instantiated video service 724 with parameters and associated parameter objectives. Starting at the bottom, a video application instance 702 has a number-of-bytes-lost parameter. An objective 704 tests whether the number of bytes lost exceeds zero, so that, for example, a warning message may be triggered when bytes start getting lost. A video system component 706 has a processor load parameter. Here, two objectives 708 are associated with the parameter to test whether the parameter value is greater than or equal to 85% and 100%, respectively. One objective might initiate precautionary actions (such as bring another system online), and the other objective might initiate a violation report.

A video streaming component 710 has an availability parameter that is determined from the parameters of the video application and video system components' parameters. Again, two objectives 712 are associated with the parameter. Note that each of the components is shown with a single parameter solely for clarity, and that in fact, multiple parameters would be typical for each, and each parameter may have zero or more objectives associated with it.

Similarly, an IP network component 714 has a Used Bandwidth parameter with two objectives 716, and a web portal component 718 has an availability parameter with two objectives 720. A video feeder component 722 is shown with a status parameter and no objective. The video service 724 has an availability parameter that is determined from the web portal 718, IP network 714, video streaming 710, and video feeder 722 parameters. Two objectives 726 are associated with the video service availability parameter.

The meta-model structure allows a customer to negotiate, contract, and monitor services in a well-defined and configurable manner. Evaluation of the parameters is performed by the data collector 326 and the performance data manager 332 in real time, and evaluation of the various parameter, component, and service level objectives is performed concurrently by SLO monitoring component 336. The GUI component 350 allows users to define service level agreement models, initiate the tracking of service level objectives for those models, and monitor the compliance with those service level objectives in real-time or near-real-time. The flexibility and response time of this model depends largely on the ability of the performance data manager 332 to evaluate model parameters in a timely and reliable manner.

Service parameters 610 are inter-dependent, meaning that calculation steps are sometimes required to obtain "upper" service parameters from "lower" service parameters. As an example, a state parameter of a given service component (e.g., operational states of DNS components 508, 510) may be aggregated to obtain the same service parameter (operational state) in upper service components (IP access component 506). Interdependence can also occur within a given service component.

Relational Database

For performance and scalability, all service parameter calculations are preferably performed in a relational database management system (RDBMS) by embedded mechanisms (i.e. stored procedures) instead of a customized dedicated process. In the preferred embodiment, Oracle 9i is employed, which offers enhanced performance of PL/SQL collections, and robust embedded Oracle mechanisms (e.g. triggers, PL/SQL stored procedures). In the preferred embodiment, the service parameter values calculations are performed by action procedures (also called "triggers").

To avoid performance and reliability problems when the size and complexity of the service model becomes large, the performance data manager automatically groups the parameters and calculations into "calculation clusters" using a novel technique described below. This grouping significantly improves system efficiency and assures predictability without losing the benefits that triggers offer.

Relational databases are based upon tables, in which columns represent fields and rows represent records having a set of corresponding values for each field. In a properly constructed relational database, each table holds information concerning only one entity type. For example, one table may represent parameter values, while another table represents classes of concrete service components, and while yet another table represents instances of the concrete service components. RDBMSs allow users to establish relationships between columns of different tables. So, for example, a user can determine which parameter values are associated with a given instance of a concrete service component. Normally each relationship is accomplished through the use of a "key" column in the related tables that contains a shared value unique to the associated records.

An action procedure, or "trigger", is an RDBMS mechanism that operates each time a column value is updated within a table. In Oracle, the triggers may be procedures written in PL/SQL, Java, or C that execute (fire) implicitly whenever a table or view is modified, or when some user actions or database system actions occur.

The action procedure can implement automatically any desired software processing that depends on the updated cell value. This can lead to updating of other cells in the same table or in other tables, and these updates can in turn trigger further action procedures. This provides a convenient way to automate user-defined procedures without having to: a) build a complex data processing procedure based on data in memory, b) limit the processing to a pre-defined set of expressions, or c) re-compute all results in response to each update.

The triggers associated to a table column can be used to compute the secondary parameters and/or aggregation values. For the secondary parameter calculations, a trigger may be declared for: 1) each column storing primary parameter values needed to compute a secondary parameter value, and 2) each column storing secondary parameter values needed to compute another secondary parameter value. If a secondary parameter depends on several parameters, triggers may be created on all the columns representing the input parameters.

The trigger bodies thus compute new parameter values, using parameter calculation expressions given by the service designer. As a trigger cannot modify a mutating table (a mutating table is a table that is currently being modified by an UPDATE, DELETE or INSERT statement), the new parameter values preferably are first stored in a temporary table and then re-injected by the parameter calculation engine into the right table.

The convenience of triggers may come at a price. As the number of parameters and instantiated service components grow, the resulting complexity of the database model grows exponentially without any control on the sequence of action procedure operation. To overcome this problem, a clustering technique is introduced below to group the parameter calculations into efficient calculation "clusters" that maintain the necessary sequencing of operations and that maximize the performance speed of the calculation engine.

Calculation Organization

The calculation of secondary parameters begins with values given by data feeders 320. Data collector 326 maps these values to primary parameters. Thereafter, secondary parameters are defined by expressions that may operate on primary and/or other secondary parameters. The parameter calculations are preferably performed by defining action procedures on parameter tables. Service parameter expressions are preferably coded in either Java or in PL/SQL, and stored in a separate table. One advantage of doing this is that each of these calculation procedures will be re-useable once created. Indeed if the same function is needed elsewhere, it can just be referenced; no heavy code duplication will be required.

Expressions have only one output (a service parameter), but potentially have several inputs. Preferably, the expression for a parameter of a given service component can only be defined on primary parameters, those secondary parameters from the given service component, and/or those secondary parameters from service components directly linked to the given service component. This allows for efficient algorithm modularization.

The manager 332 the parameter calculations for the service models into calculation clusters when operation of the model is initiated in the system. Each service component will be associated with one of the calculation clusters. When there are calculation dependencies between clusters, the manager determines the processing order to ensure that lower clusters are fully computed before their parameters are collected for use in an upper cluster.

The manager 332 creates a set of tables for each cluster. The set includes an input table, a temporary input table, an output table, a primary table, a collection table, and a temporary table.

The input table stores a history of primary parameter values that have been received by the service components in the calculation cluster.

The temporary input table holds all the primary parameters modified after the beginning of the previous calculation.

The output table stores a history of primary parameter input values and calculated secondary parameter values for components in the calculation cluster.

The primary table stores a complete set of current primary parameter values which is updated from the temporary input table at the beginning of the calculation.

The collection table stores the primary and secondary parameters for the components of the calculation cluster.

The temporary table stores values calculated by triggers defined on the collection table.

Manager 332 performs RDBMS operations on this set of tables to provide parameter calculations in real time. Triggers may be defined on the primary table for immediate propagation of dependencies on sensitive values, but most triggers are preferably defined on the collection table.

The collection table is updated with the contents of the primary table, causing the triggers to fire. The results of the trigger calculations form the temporary table, which is then used to update the collections table again. This may cause the triggers to fire again, generating a new temporary table. This process is repeated until the triggers generate no new results, at which point the collection table contents are added to the output table.

Figure 8:
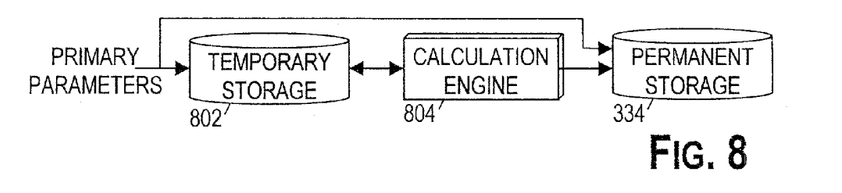
FIG. 8 shows the process flow of a calculation engine.

The data flow model employed by manager 332 is shown in FIG. 8. The primary parameters are stored in temporary storage 802 and permanent storage 334. The calculation engine 804 operates on the parameters in temporary storage to determine secondary parameters, which eventually are also placed in permanent storage. There may be multiple calculation engines 804 in operation.

Other mechanisms besides triggers may be employed. PL/SQL (Oracle's procedural extension of SQL) offers the possibility of manipulating whole collections of data, and treating related but dissimilar data as a logical unit. This possibility may simplify aggregation calculations, and reduce the number of triggers fired in a calculation update.

Cluster Formation

The performance data manager 332 analyzes the specific service models and forms "clusters" of components that can be efficiently processed together. The formation of these calculation clusters combines the parameters (and calculations thereof) into a single set of tables. This significantly reduces the number of tables without sacrificing model flexibility or calculation reliability.

Figure 9:
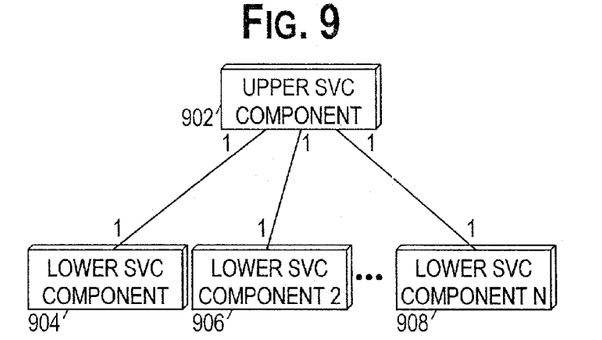
FIGS. 9–12 show types of relationships between service components.

The formation of calculation clusters is based on the structure of the concrete service model (such as that described in FIG. 5a). The meta-model of FIG. 4 anticipates four types of relationships between service components in the concrete service model. FIG. 9 shows an upper service component 902 having parameters defined on one or more 1-to-1 relationships with parameters of lower service components 904–908. Such relationships cause the components to be strongly linked together, and the parameter calculations for the service components may be performed together in a single set of database table.

Figure 10:
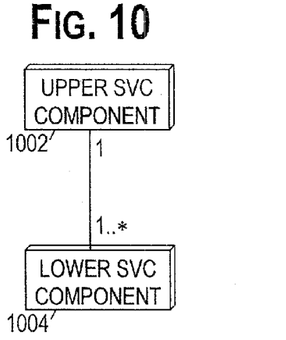

FIG. 10 shows an upper service component 1002 having a parameter defined on a 1-to-n relationship with lower service components 1004–1008. Such expressions are preferably limited to aggregation functions between one input parameter for each of the lower service components and one output parameter for the upper service component. When this relationship exists in the service model, the manager 332 performs a cluster division here, and each of the lower service components forms the root of a corresponding calculation cluster.

Figure 11:
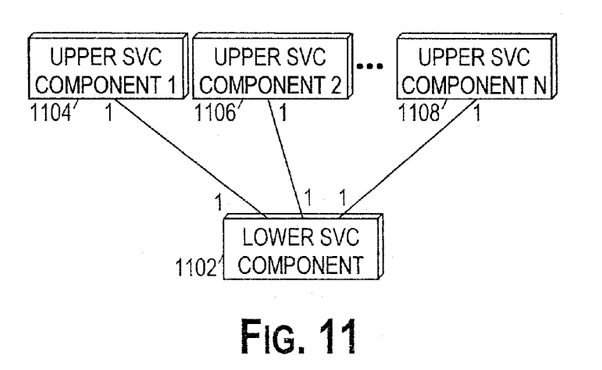
Figure 12:
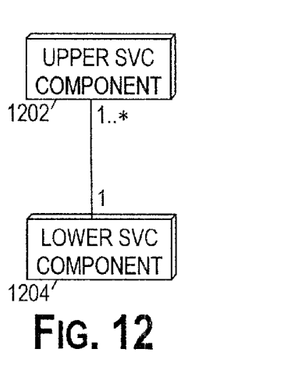

FIG. 11 shows a set of different upper service components 1104–1108 each having a parameter defined on a 1-to-1 relationship with a shared lower service component 1102. FIG. 12 shows a related situation, in which an upper service component 1202 has a parameter defined on an n-to-1 relationship with a lower service component 1204. In both situations, it is preferred to provide a cluster division here, making the lower service component a root of a new calculation cluster. The calculated parameters for the lower service component can then be shared without duplicating computations.

Figure 13:
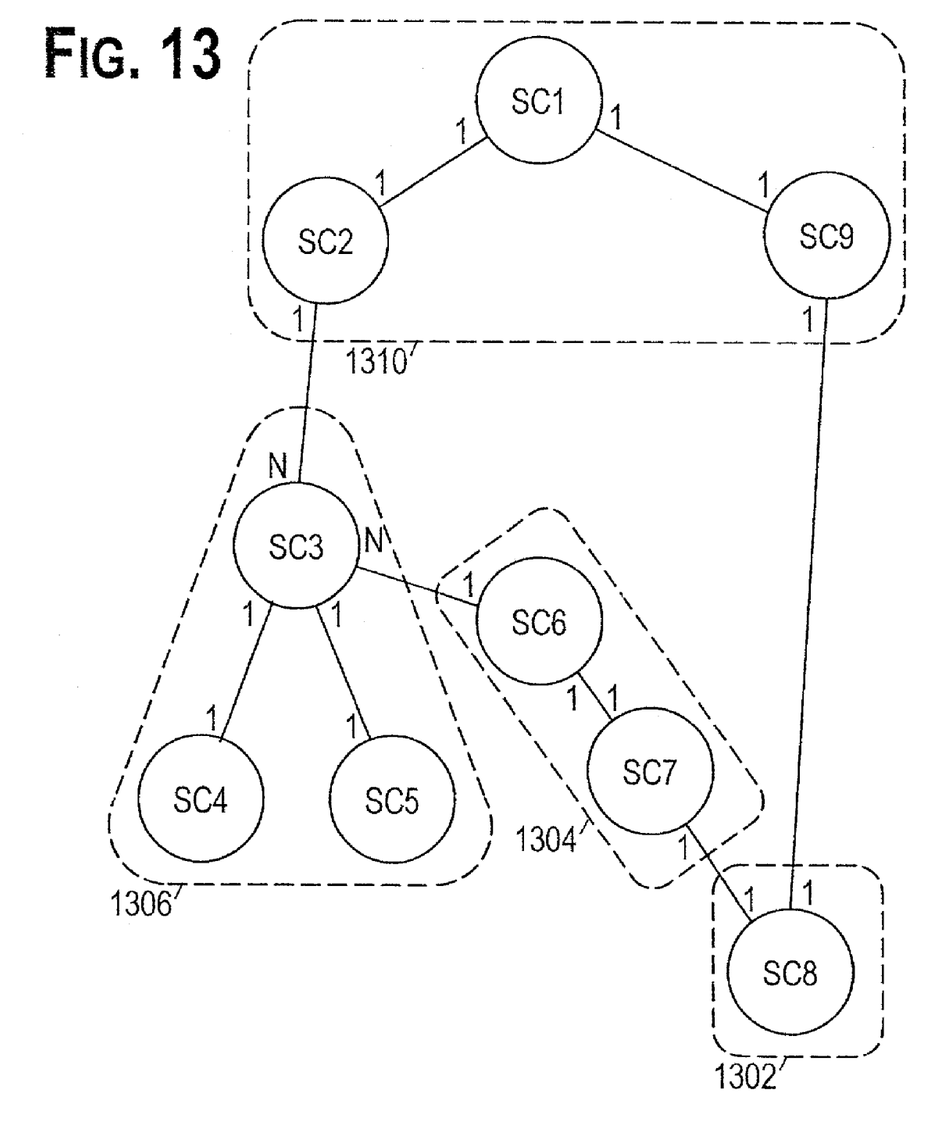
FIG. 13 shows a service component hierarchy divided into calculation clusters.

FIG. 13 shows a example of a concrete service model having nine service components SC1–SC9 (recall, though, that each component may have multiple instantiations when the concrete service model is deployed) divided into four calculation clusters. The first calculation cluster 1302 is formed by component SC8, which is placed in a separate calculation cluster from its parents because SC8 is shared. The calculation engine operating on calculation cluster 1302 provides the calculated parameter values for SC8 to the calculation engines for two other clusters 1304, 1310.

The second calculation cluster 1304 is formed by components SC6 and SC7. The n-to-1 relationship between SC3 and SC6 makes it desirable to place SC6 in a separate calculation cluster from SC3. The 1-to-1 relationship between SC6 and SC7 makes it desirable to keep them both in the same cluster.

The third calculation cluster 1306 is formed by components SC3, SC4, SC5. The 1-to-n relationship between SC2 and SC3 makes it desirable to place SC3 in a separate calculation cluster from SC2, and the 1-to-1 relationship between SC3 and SC4, SC5 makes it desirable to cluster these together.

The fourth calculation cluster 1310 is formed by components SC1, SC2, SC9. Service component SC1 is the root of the service model, and the 1-to-1 relationship that SC1 has with SC2 and SC9 makes it desirable to cluster these together.

The result of the clustering is to significantly reduce the number of relational database tables and consequently the number of steps necessary to complete the parameter calculations for a service model. Further, the calculations can be parallelized to some extent by distributing the calculation clusters among multiple instances of manager 332.

In one embodiment, calculations are performed periodically, so that, e.g., the parameters are updated once every five minutes. In the preferred embodiment, a parameter value change triggers a calculation update for all parameters affected by the changed parameter. The change propagates until all affected parameters are updated. Database triggers may be used to implement this second embodiment. In either case, the new parameter values are stored in the database 334 after the completion of the update. A mixture of both methods may be used with parameters affected by frequent updates being calculated on a scheduling basis, and infrequently-updated parameters being updated by triggered propagation.

Before the model is put into operation, it is validated to ensure compliance with various rules. First, it is verified that all parameters expressions are specified on defined service component associations. For a given association between service components, it is verified that all the expressions operate in the same direction (i.e. the output parameters of these expressions are to the same service component). This allows a unique determination of the service component hierarchy. Next, it is verified that there are no cycles in the service component hierarchy. Verification that the input and output parameters are well defined is also done. Consistency of input and output data types is verified.

The disclosed system allows the service provider to define without software development new service models and to deploy these services on the fly without any monitoring interruption. The system collects, aggregates, correlates, and merges information end-to-end across the entire service operator's network, from the Radio Access Network to the Application and Content servers (such as Web Servers, e-mail, and file servers). It translates operational data into customer and service level information. The system supports continuous service improvement by capturing service level information for root cause analysis, trending and reporting. Services are monitored in real-time by defining thresholds. If a service level deviates from a committed level, The system can forward a QoS alarm to the alarm handling application.

Numerous variations and modifications will become apparent to those skilled in the art once the above disclosure is fully appreciated. It is intended that the following claims be interpreted to embrace all such variations and modifications.

What is claimed is:

1. A method for monitoring service performance, the method comprising:
   collecting service information from one or more sources in a telecommunications network;
   converting the service information into values of primary parameters of a service model;
   processing a hierarchy of the service model to determine at least one cluster, the cluster comprising one or more service components having at least one parameter that is shared among the service components of the cluster;
   determining the clusters from the service model, wherein the determining includes: dividing a hierarchy of service components so as to separate service components related by 1-to-n and n-to-1 relationships; and
   calculating values of secondary parameters of the service model from the primary parameter values, wherein the calculating is performed by operations on tables in a relational database, and wherein the tables are structured to represent clusters of service components in the service model, the at least one parameter being indicative of a quality of a service being provided by the telecommunications network and the one or more service components being associated with the service being provided.

2. The method of claim 1, wherein each cluster is represented by a set of tables further comprises a collection table, wherein the collection table stores values of primary and secondary parameters associated with the service components belonging to the cluster.

3. The method of claim 2, wherein the calculating values of secondary parameters further comprises:

updating parameter values in the collection table, thereby triggering action procedures defined on columns of the collection table.

4. The method of claim 2, wherein the set of tables further comprises an output table that stores a history of calculated and input parameter values for service components belonging to the cluster.

5. The method of claim 1, further comprising:

comparing secondary parameter values with service parameter objectives having associated thresholds and actions; and initiating an associated action if a calculated parameter value crosses an associated threshold of a service parameter objective.

6. The method of claim 5, wherein the associated action further comprises reconfiguring a component of the telecommunications network so as to return the calculated parameter value to a desired range.

7. The method of claim 5, wherein the service parameter objectives are set in accordance with a service level agreement.

8. A telecommunications network management system comprising:

a service database that stores a service model, wherein the service model comprises a hierarchy of service components, each service component having one or more parameters, wherein at least some of the parameters are primary parameters having values collected from sources in the network, and at least some of the parameters are secondary parameters having values calculated from other parameters;

a service repository manager that provides access to the service database and tracks deployed instances of each service component;

a data collector component that receives service information from one or more sources in a telecommunications network, and that converts the service information into values of primary parameters of a service model; and a performance data manager that receives the service component parameters from the service repository manager, wherein the performance data manager obtains and processes the service model hierarchy to determine multiple clusters, each cluster comprising one or more service components having at least one parameter that is shared among the service components of the cluster, the at least one parameter being indicative of a quality of a service being provided by the telecommunications network and the one or more service components being associated with the service being provided, wherein the performance data manager divides the service model hierarchy to determine service component clusters by separating components related by 1-to-n n-to-1 relationships.

9. The system of claim 8 wherein the performance data manager further receives the primary parameter values from the data collector component, and calculates values of secondary parameters of the service component instances, wherein the calculations are performed by operations on tables in relational database, and wherein each cluster is represented by a corresponding set of tables.

10. The system of claim 9, wherein the shared parameter is shared among the service components of the cluster without duplicate computations.

11. The system of claim 9, wherein the set of tables for each cluster further comprises a collection table that stores values of primary and secondary parameters associated with the service components belonging to the cluster.

12. The system of claim 11 wherein calculations of parameter values are performed by action procedures defined on columns of the collection table, and wherein the action procedures are triggered by updates of parameter values in the table.

13. The system of claim 11, wherein the set of tables further comprises an output table that stores a history of calculated and input parameter values for service components belonging to the cluster.

14. The system of claim 9, further comprising:

a service level objective (SLO) monitor that receives calculated parameter values from the performance data manager and that compares the calculated parameter values to service parameter objectives having associated thresholds and actions, wherein the SLO monitor initiates an associated action if a calculated parameter value crosses an associated threshold of a service parameter objective.

15. The system of claim 14, wherein the associated action further comprises reconfiguring a component of the telecommunications network so as to return the calculated parameter value to a desired range.

16. The system of claim 14, wherein the service parameter objectives are set in accordance with a service level agreement.

* * * * *

UNITED STATES PATENT AND TRADEMARK OFFICE
CERTIFICATE OF CORRECTION

PATENT NO. : 7,099,879 B2 Page 1 of 1
APPLICATION NO. : 10/133166
DATED : August 29, 2006
INVENTOR(S) : Olivier Tacaille et al.

It is certified that error appears in the above-identified patent and that said Letters Patent is hereby corrected as shown below:

In column 18, line 7, in Claim 8, after "1-to-n" insert -- and --.

In column 18, line 13, in Claim 9, after "tables in" insert -- a --.

Signed and Sealed this

Twenty-fifth Day of May, 2010

David J. Kappos
*Director of the United States Patent and Trademark Office*